United States Patent [19]

Mintzer

[11] Patent Number: 5,210,602
[45] Date of Patent: May 11, 1993

[54] COUPLED-COLOR ERROR DIFFUSION

[75] Inventor: Frederick C. Mintzer, Shrub Oak, N.Y.

[73] Assignee: International Business Machines Corporation, Armonk, N.Y.

[21] Appl. No.: 660,776

[22] Filed: Feb. 25, 1991

[51] Int. Cl.⁵ .............................................. G03F 3/08
[52] U.S. Cl. ..................... 358/80; 358/455; 358/456; 358/447; 382/50; 382/54
[58] Field of Search ............... 358/80, 455, 456, 457, 358/458, 465, 466, 78, 447; 382/54, 56, 50, 52

[56] References Cited

U.S. PATENT DOCUMENTS

| | | | |
|---|---|---|---|
| 4,654,720 | 3/1987 | Tozawa | 358/283 |
| 4,668,995 | 5/1987 | Chen et al. | 358/282 |
| 4,733,230 | 3/1988 | Kurihara et al. | 340/728 |
| 4,742,400 | 5/1988 | Tsuji | 358/284 |
| 4,809,082 | 2/1989 | Yamaguchi et al. | 358/283 |
| 4,878,125 | 10/1989 | Katayama et al. | 358/456 |
| 4,890,167 | 12/1989 | Nakazato et al. | 358/443 |
| 4,891,710 | 1/1990 | Nakazato et al. | 358/443 |
| 4,969,052 | 11/1990 | Ishida et al. | 358/457 |
| 5,045,952 | 9/1991 | Eschbach | 358/455 |
| 5,119,186 | 6/1992 | Deacon et al. | 358/78 |

OTHER PUBLICATIONS

IBM TDB vol. 28, No. 7, pp. 3003–3005, "Error Diffusion Algorithm for a Display System of Color Look-Up Table Type", by Y. Tozawa.

Primary Examiner—Edward L. Coles, Sr.
Assistant Examiner—C. Lam
Attorney, Agent, or Firm—Thomas P. Dowd

[57] ABSTRACT

A system and method for improving the quality of the output of a full-color image on a reproduction device, such as a display on a monitor or printout from a printer, that only consists of a small number of colors in comparison to the number of colors represented by the input signals. The disclosure involves specifying a new quantization method for multi-color images, rendered with orthogonal or separable color image palettes, that takes advantage of the calculations done by error diffusion. Accordingly, the image input signals are processed using the quantization error generated by one color component of a given pixel to influence the quantization of subsequent color components of the same pixel, and in such a way that the color image, so rendered, appears less grainy.

18 Claims, 7 Drawing Sheets

COUPLED-COLOR ERROR DIFFUSION

BACKGROUND OF THE INVENTION

1. Field of the Invention

The present invention relates to electronic image processing and, more particularly, to a system for improving the quality of the output of full-color images reproduced on monitors that display a comparatively small number of colors, or printers that print a comparatively small numbers of colors, using halftoning and error diffusion techniques wherein the quantization error of one color of a given pixel is used to modify the quantization of the other colors of that pixel.

2. Prior Art

In full-color images, each pixel is typically represented as one of 16 million colors. However, in conventional electronic displays or computer monitors, such as those used for the IBM PS/2 with VGA, only 256 colors can be displayed. It is therefore a problem to obtain a top-quality display of full-color images on a monitor that can display only a small number of colors. Similarly, conventional printers are limited in the number of colors of a full-color image that can be reproduced. The present invention is directed to overcoming this color reproduction problem utilizing halftoning and error diffusion techniques.

Halftoning

Halftoning, as the term is used herein, refers to electronic processing that accepts an input image for which each pixel can take on any one of a large number of shades of gray, or shades of colors, and produces an output image for which each pixel can take on any one of a smaller number of shades of gray, or shades of colors. With the proper choice of the output-pixel values, the output image, when viewed at a distance, may be made to appear to have a full complement of shades. For a good overview of halftoning techniques, reference may be had to the text by R. Ulichney, *Digital Halftoning*, Cambridge, Mass., MIT Press, 1987.

Error Diffusion

Error diffusion generally is a well known technique for halftoning images. Its first use is usually credited to Robert Floyd and Louis Steinberg, as set forth in "An Adaptive Algorithm for Spatial Gray Scale," 1975 SID *International Symposium, Digest of Technical Papers*, pp. 36-37. Many variations of error diffusion are also discussed in R. Ulichney's above-cited text, *Digital Halftoning*.

Error Diffusion Processing Steps

Error diffusion begins with the diffused errors, $e_{i,j}$, at each pixel position equal to zero. Mathematically, this is described as: $e_{i,j}=0 \; \forall \; i,j$. Then the input pixels are processed in order, following the processing of a selected pixel at an initial or first pixel position, against which the diffused errors are determined, with the processing steps for each remaining pixel being:

1. The modified-pixel value, $mp_{i,j}$, is computed as the sum of the input-pixel value, $ip_{i,j}$, and the value of the diffused error at that pixel position. Mathematically, this is described as:

$$mp_{i,j}=ip_{i,j}+e_{i,j}.$$

2. The output-pixel value, $op_{i,j}$, is selected as one of the possible output values, $q_l$, that is near the modified pixel value. Mathematically, this is described as:

$$op_{i,j}=Q(mp_{i,j})$$

where $Q(x)$ selects one of the available output values, $q_l$, near $x$.

3. The quantization-error, $\delta_{i,j}$, is computed as the difference between the modified-pixel value and the output-pixel value. Mathematically, this is described as:

$$\delta_{i,j}=mp_{i,j}-op_{i,j}.$$

4. At pixel positions not yet processed, the diffused errors are incremented by amounts that are proportional to the quantization-error at the pixel position. Mathematically, this is described as:

$$e_{i+r,j+s}=e_{i+r,j+s}+c_{r,s}\delta_{i,j}$$

subject to $\Sigma c_{r,s}=\gamma$.

Many of the differences in the various error diffusion techniques are variations in the choices made for the diffusion coefficients, $c_{r,s}$, used in step 4. For instance, in the above-cited Floyd and Steinberg article the coefficients are constants, while an example of the use of random variable coefficients is found in U.S. Pat. No. 4,654,721, issued Mar. 31, 1987, to Gerald Goertzel and Gerhard R. Thompson and entitled, "System for Reproducing Multi-Level Digital Images on a Bi-Level Printer of Fixed Dot Size".

Error Diffusion Applied to Three Color Planes Independently

Error diffusion is particularly suitable for application to the situation where the display palette is orthogonal in red, green, and blue. By an orthogonal palette in this situation is meant that:
if the red value $\gamma$ is in the display palette,
if the green value g is in the display palette, and
if the blue value b is in the display palette,
then the color triplet r,g,b is also in the display palette.

A color input image may be treated as three input images;
where
$ip_{i,j}{}^{c1}$ is the input image for color 1,
$ip_{i,j}{}^{c2}$ is the input image for color 2, and
$ip_{i,j}{}^{c3}$ is the input image for color 3.
Similarly, a color output image may be considered as three output images; where
$op_{i,j}{}^{c1}$ is the output image for color 1,
$op_{i,j}{}^{c2}$ is the output image for color 2, and
$op_{i,j}{}^{c3}$ is the output image for color 3.
With an orthogonal palette, the three input images that constitute a color input image may be processed independently, using error diffusion, to produce three output images which are then combined to constitute a color output image. By this is meant that:
$ip_{i,j}{}^{c1}$ is processed by the steps described above in Error Diffusion Processing Steps to produce $op_{i,j}{}^{c1}$.
$ip_{i,j}{}^{c2}$ is processed by the steps described above in Error Diffusion Processing Steps to produce $op_{i,j}{}^{c2}$.
$ip_{i,j}{}^{c3}$ is processed by the steps described above in Error Diffusion Processing Steps to produce $op_{i,j}{}^{c3}$.

This processing can produce good quality color images with accurate color and has been demonstrated and used. However, artifacts occur in the output image, the main one being the amount of visually-apparent texture in the image reproduction. The present invention is directed to improving on this processing by minimizing this main artifact.

SUMMARY OF THE INVENTION

The invention utilizes what may be called coupled-color error diffusion processing on input signals representing a full-color image to produce an output image with visually improved color reproduction and is particularly suitable for use with an orthogonal color palette. More specifically, signals representative of the colors of the pixels of a full-color image are input to a processing device, such as a personal computer, to ultimately produce a representation of the image on an output device, such as a display on a monitor or a printout from a printer, that is only able to produce a small number of colors in comparison to the number of colors represented by the input signals. To process the input signals in such a manner as to obtain an output in a form that best reproduces or represents the full-color image to a viewer of the output product, i.e., the image on the monitor or the image printed out by the printer, error diffusion is applied to the input signals using an improved technique as follows. An initial pixel position is selected which acts as the basis against which the diffused errors are measured. Then, beginning with the diffused errors for each color (e.g., three colors) and at each pixel position equal to zero, that is, $e_{i,j}{}^{ck}=0 \ \forall \ i,j$ for $ck=c1,c2,c3$, the input pixel signals of a color image are processed in order by the following steps:

a modified-pixel value for color 1 is computed for the pixel at a first or given position (immediately following the initial pixel position) as the color-1-input-pixel value + the value of the color-1-diffused-error, at that pixel position, the color-1-output-pixel value at the given position is selected from among those possible near the modified-pixel value for color 1, and the color 1 quantization error is computed as the difference between the color-1-modified-pixel value and the color-1-output pixel value;

a modified-pixel value for color 2 is computed similarly for the pixel at the given position, as the color-2-input-pixel value + the value of the color-2-diffused-error, at that pixel position;

the color-2-output-pixel value at the given position is selected from among those possible near the sum of the color-2-modified-pixel value and the product of a constant and the color-1-quantization error;

the color-2-quantization error is computed similarly to the color-1-quantization error, i.e., the error is computed as the difference between the color-2-modified-pixel value and the color-2-output pixel value;

a modified-pixel value for color 3 is computed similarly for the pixel at the given position, as the color-3-input-pixel value + the value of the color-3-diffused-error, at that pixel position;

the color-3-output-pixel value at the given position is selected from among those possible near the sum of the color-3-modified-pixel value and the product of a constant and the color-1-quantization error and the product of another constant and the color-2-quantization error;

the color-3-quantization error is computed similarly to the color-1-quantization error; and at pixel positions not yet processed, the diffused errors for color 1 are incremented by amounts computed from the color-1-quantization error at the given pixel position, and the diffused errors for color 2 and color 3 are similarly incremented at each position, using the amounts computed from the respective color-2-quantization error and color-3-quantization error at the given pixel position.

It will be seen that the ordering of these steps is not critical as many other orderings of the steps would still produce the same outputs. The result of combining these outputs is an output image representative of a full-color input image using a small number of colors in comparison to the number of colors in the input image but minimizing artifacts such as the amount of visually-apparent texture in the output image.

DETAILED DESCRIPTION OF THE PREFERRED EMBODIMENT

Figure 1A:
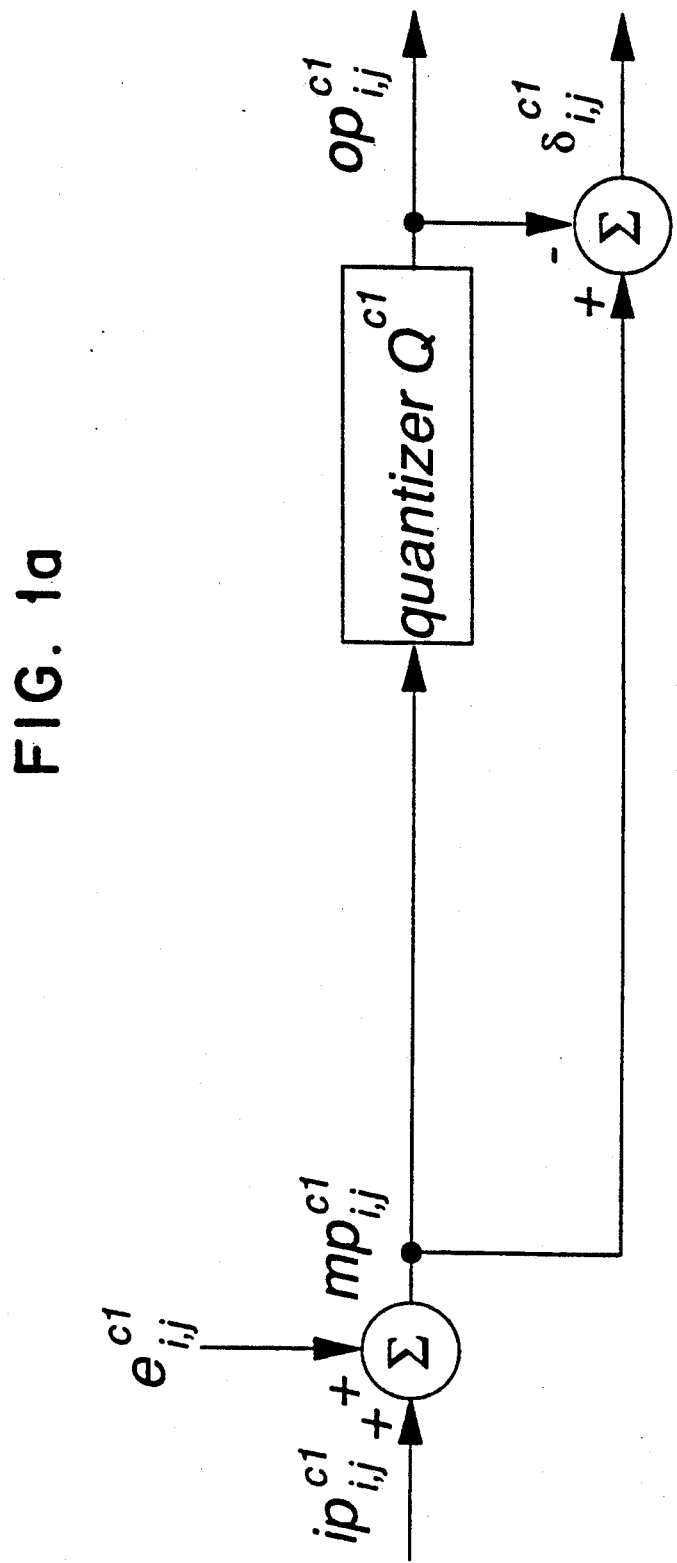
FIG. 1(a) is a diagrammatic representation of a system for the quantization of the first color plane in accordance with the invention.

The present invention uses a technique which may be called coupled-color error diffusion and in the preferred embodiment to be described the invention is applied to a three color system, i.e., with three color planes, wherein green is used as color 1, red as color 2, and blue as color 3. The technique is directed to improving the quality of the output of full-color images on monitors that display a comparatively small number of colors, or printers that print a comparatively small number of colors, using the quantization error of one color of a given pixel to modify the other colors of that pixel. More particularly, in image processing using error diffusion, as noted above, a modified input signal is compared to a set of possible output signals and one of the output signals is selected. Typically, the "nearest" output signal is chosen. This process of selecting an output that is near the input is called "quantization". The difference between the input and the selected signal is called the "quantization error". For a monochrome (one color with many shades) image the determination of the "nearest" color is fairly straightforward; but, for a multi-color (e.g., with multiple shades of red, green, and blue) image, the choice of nearest color (and how to select it) is not apparent. Presently the quantization of color images is done by independently processing each of the color components (usually the three: red, green, and blue). In contrast, the present invention uses the quantization error generated by one color component for a given pixel to influence the quantization of subsequent color components for the same pixel, and in such a way that the color image, so rendered, appears less grainy. The invention essentially involves, specifying a new quantization method for multi-color images, rendered with orthogonal or separable color image palettes, that takes advantage of the calculations done by error diffusion.

To begin with, using a system and method in accordance with the present invention, signals representative of the colors of the pixels of a full-color image are input to a processing device, such as a personal computer, to ultimately produce an output, such as a display on a monitor or printout from a printer, that only consists of a small number of colors in comparison to the number of colors represented by the input signals. It is accordingly desired to process the input signals in such a manner as to obtain an output in a form that best reproduces or represents the full-color image to a viewer of the output product, i.e., the image on the monitor or the image printed out by the printer. To this end, using error diffusion on the input signals and beginning with the diffused errors for each color and at each pixel position equal to zero, that is, $e_{i,j}^{ck}=0 \; \forall \; i,j$ for $ck=c1,c2,c3$, the input pixel signals of a color image are then processed, in order, by the following steps:

1. The modified-pixel value for color 1 is computed as the sum of the color-1-input-pixel value and the value of the color-1-diffused-error at a first or given pixel position in the image:

$$mp_{i,j}f^1 = ip_{i,j}f^1 + e_{i,j}f^1.$$

The first or given position may be at any location within the image based on the selection of a convenient starting point. The starting point is an initial pixel position, at which the pixel input signals are used as the basis for determining the diffused errors of the remaining pixel positions. The pixel in the first pixel position in the upper right hand corner of the image is usually a convenient choice for a starting point so that the first or given position typically would be the second, i.e., horizontally-adjacent, position in the upper right hand corner.

2. The color-1-output-pixel value is selected as one of the possible color-1-output values, $q_f^{c1}$, near the modified pixel value:

$$op_{i,j}f^1 = Q^{c1}(mp_{i,j}f^1)$$

3. The color-1-quantization-error is computed as the difference between the color-1-modified-pixel value and the color-1-output-pixel value:

$$\delta_{i,j}f^1 = mp_{i,j}f^1 - op_{i,j}f^1.$$

An implementation of these steps 1 through 3 is illustrated in FIG. 1(a). In the figure the component $\Sigma$ represents any device that can compute sums or differences of signals; and whether a signal is to be added or subtracted is indicated by a + or −, repectively. The block labelled quantization $Q^{c1}$ represents the component performing the quantization operation. This operation may be carried out by computation but normally a look-up-table is used to implement it.

4. The modified-pixel value for color 2 is similarly computed as:

$$mp_{i,j}f^2 = ip_{i,j}f^2 + e_{i,j}f^2.$$

5. The color-2-output-pixel value is selected as one of the possible color-2-output values, $q_f^{c2}$, near the sum of the color-2-modified-pixel value and the product of a constant and the color-1-quantization-error:

$$op_{i,j}f^2 = Q^{c2}(mp_{i,j}f^2 + a^{12}\delta_{i,j}f^1)$$

6. The color-2-quantization-error is computed similarly to the color-1-quantization-error as:

$$\delta_{i,j}f^2 = mp_{i,j}f^2 - op_{i,j}f^2.$$

Figure 1B:
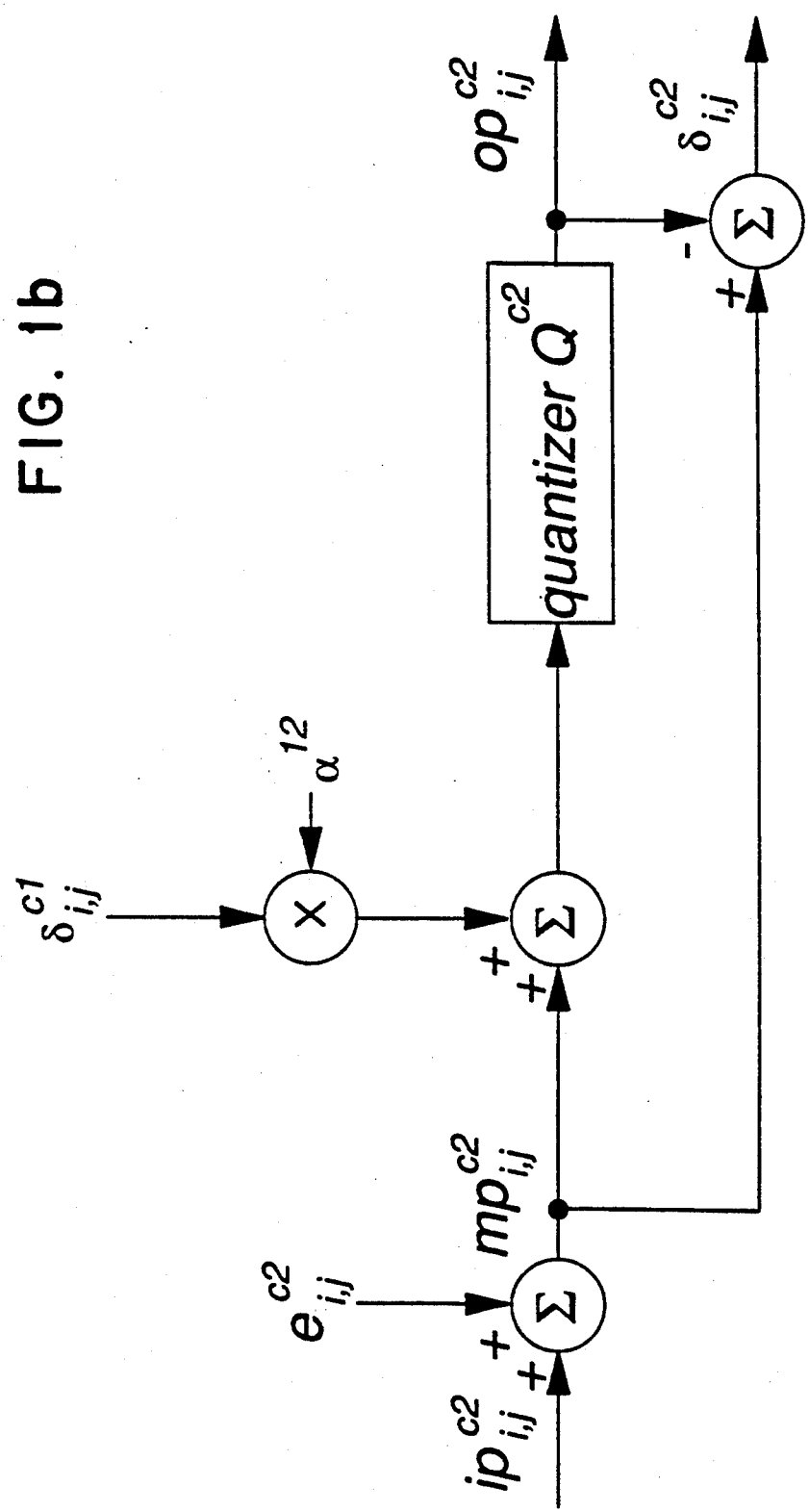
FIG. 1(b) is a diagrammatic representation of a system for the quantization of the second color plane in accordance with the invention.

An implementation of these steps 4 through 6 is illustrated in FIG. 1(b).

7. The modified-pixel value for color 3 is similarly computed as:

$$mp_{i,j}f^3 = ip_{i,j}f^3 + e_{i,j}f^3.$$

8. The color-3-output-pixel value is selected as one of the possible color-3-output values, $q_f^{c3}$, near the sum of the color-3-modified-pixel value, the product of a constant and the color-1-quantization-error, and the product of another constant and the color-2-quantization-error:

$$op_{i,j}f^3 = Q^{c3}(mp_{i,j}f^3 + a^{13}\delta_{i,j}f^1 + a^{23}\delta_{i,j}f^2)$$

9. The color-3-quantization-error is computed similarly to the color-1-quantization-error as:

$$\delta_{i,j}f^3 = mp_{i,j}f^3 - op_{i,j}f^3.$$

Figure 1C:
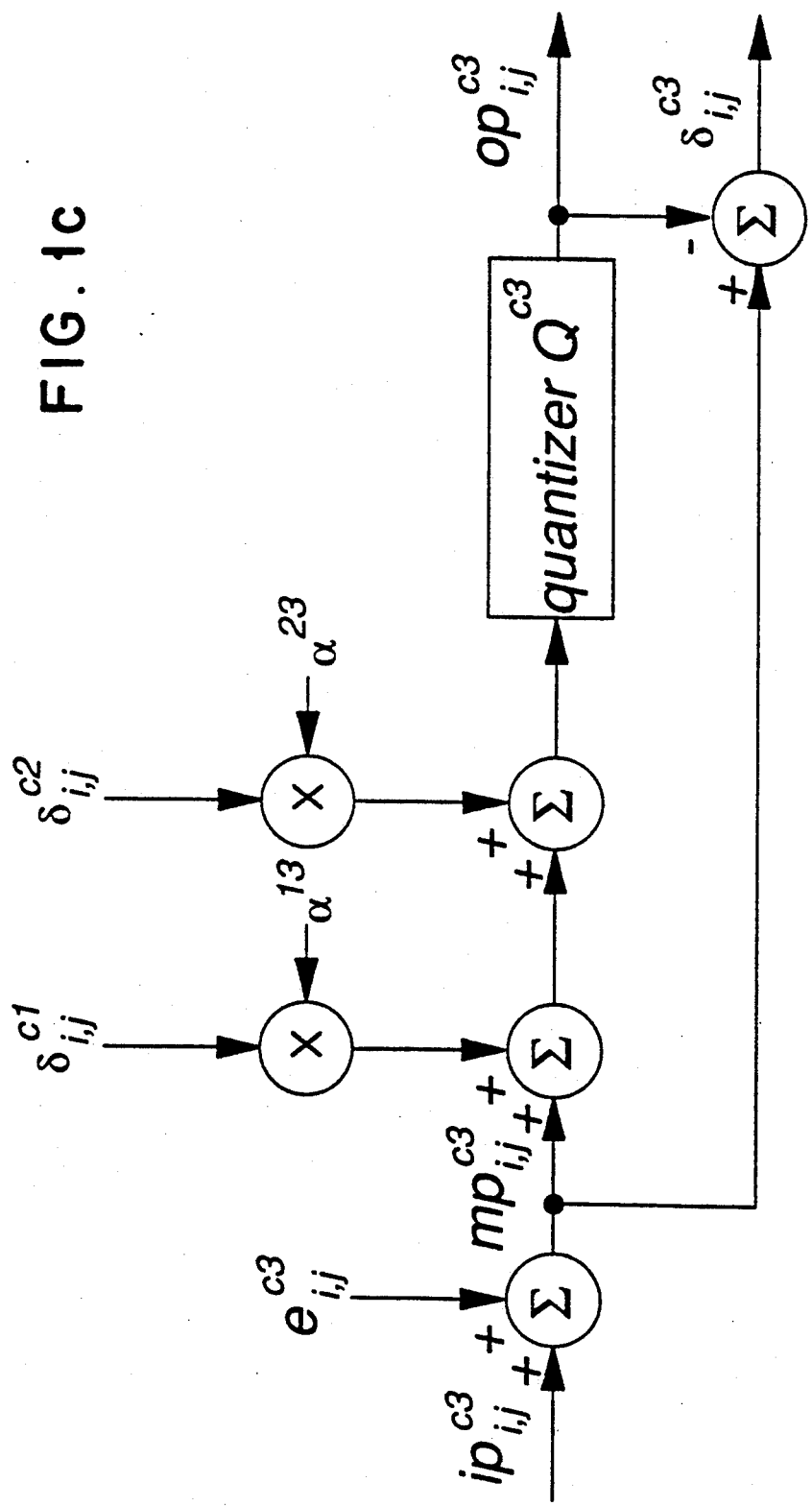
FIG. 1(c) is a diagrammatic representation of a system for the quantization of the third color plane in accordance with the invention.

The implementation of these steps 7 through 9 is illustrated in FIG. 1(c).

10. At pixel positions not yet processed, the diffused errors for color 1 are incremented by amounts computed from the color-1-quantization-error at this first pixel position as:

$$e_{i+r,j+s}^{c1} = e_{i+r,j+s}^{c1} + c_{r,s}^{c1}\delta_{i,j}f^1$$

subject to $\Sigma c_{r,s}^{c1} = \gamma^{c1}$.

Figure 2A:
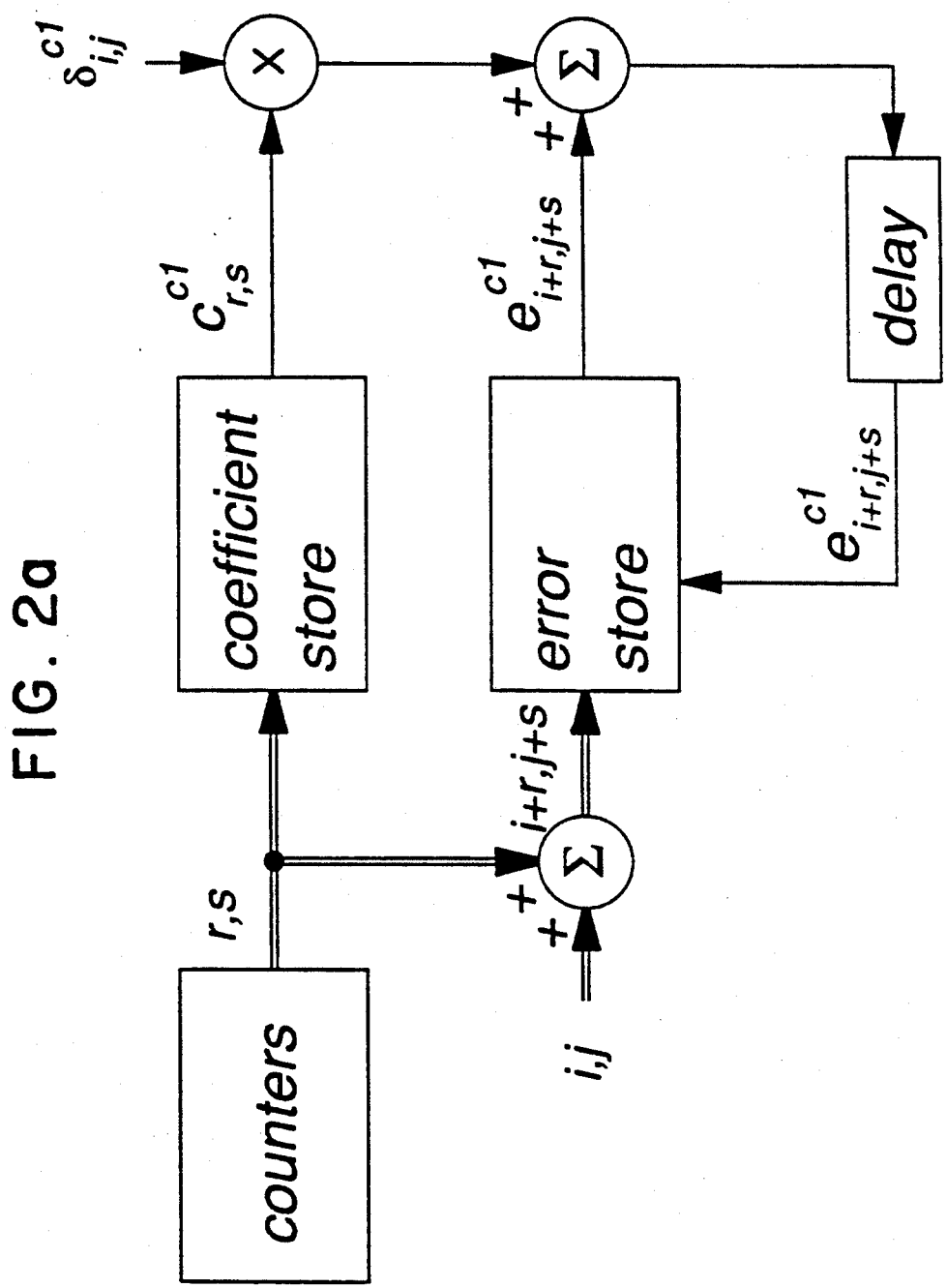
FIG. 2(a) is a diagrammatic representation of a system for incrementing the diffused errors for the first color plane in accordance with the invention.

An implementation of this step is illustrated in FIG. 2(a). As shown in the figure, counters are used to generate an index r,s, which when applied to a coefficient store, leads to the production of the coefficient $c_{r,s}^{c1}$ from the coefficient store. The index r,s is also added to the address i,j to form the indexed address, i+r,j+s, which when applied to an error store, leads to the production of error $e_{i+r,j+s}^{c1}$ from the error store. The coefficient produced is multiplied by the quantization error, $\delta_{i,j}f^1$, and added to the error from the error store to produce the updated error $e_{i+r,j+s}^{c1}$. After a delay, the updated error $e_{i+r,j+s}^{c1}$, is inserted in the error store, replacing the earlier version. This operation is repeated for each index generated by the counters.

11. The diffused errors for color 2 are similarly incremented as:

$$e_{i+r,j+s}^{c2} = e_{i+r,j+s}^{c2} + c_{r,s}^{c2}\delta_{i,j}f^2$$

subject to $\Sigma c_{r,s}^{c2} = \gamma^{c2}$.

Figure 2B:
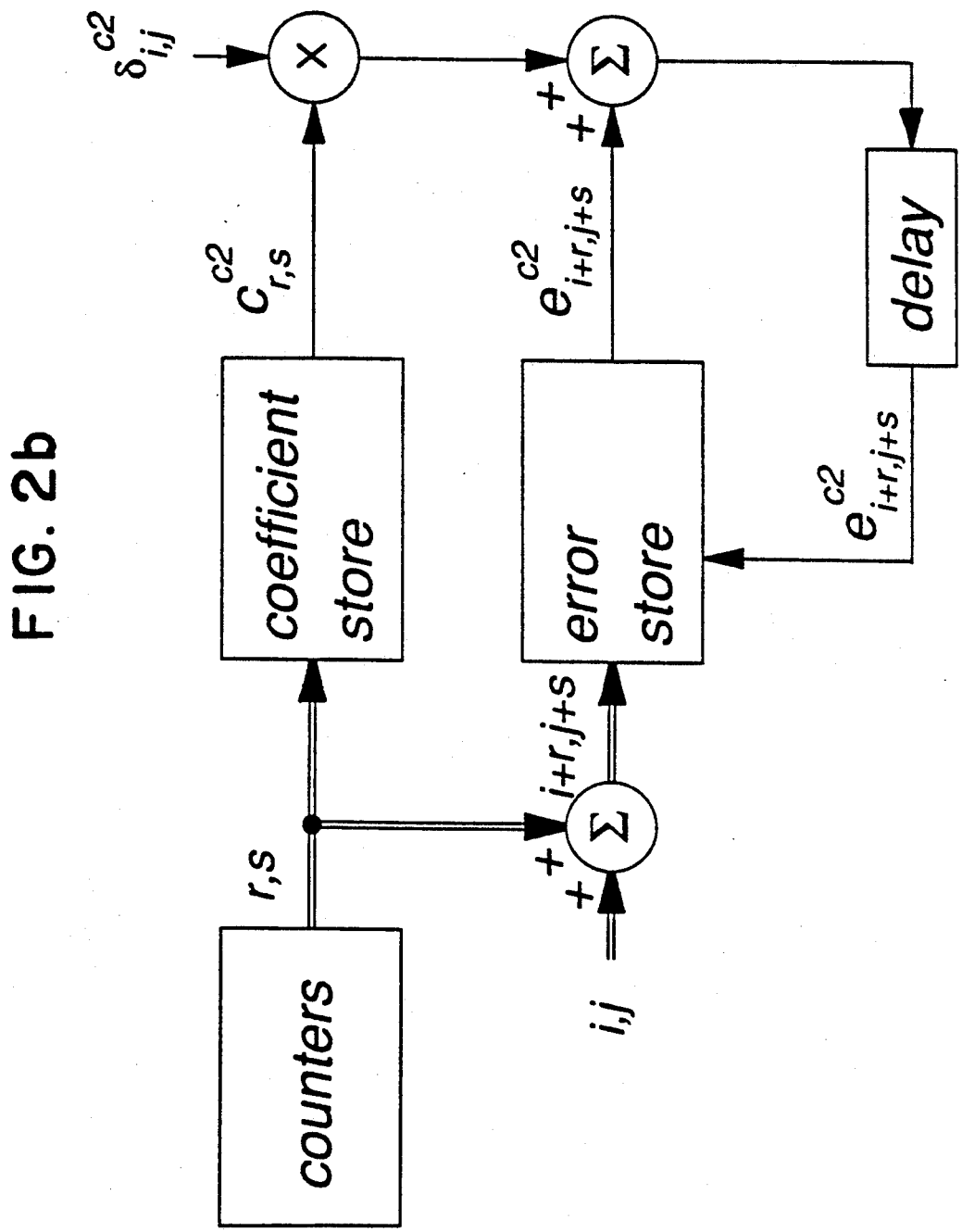
FIG. 2(b) is a diagrammatic representation of a system for incrementing the diffused errors for the second color plane in accordance with the invention.

An implementation of this step is illustrated in FIG. 2(b). This implementation is similar to the implementation of FIG. 2(a), except that the quantization error for color 2, the coefficient store for color 2, and the error store for color 2 are substituted for the quantization error for color 1, the coefficient store for color 1, and the error store for color 1, respectively.

12. The diffused errors for color 3 are similarly incremented as:

$$e_{i+r,j+s}{}^{c3} = e_{i+r,j+s}{}^{c3} + c_{r,s}{}^{c3}\delta_{i,j}{}^{c3}$$

subject to $\Sigma c_{r,s}{}^{c3} = \gamma^{c3}$.

Figure 2C:
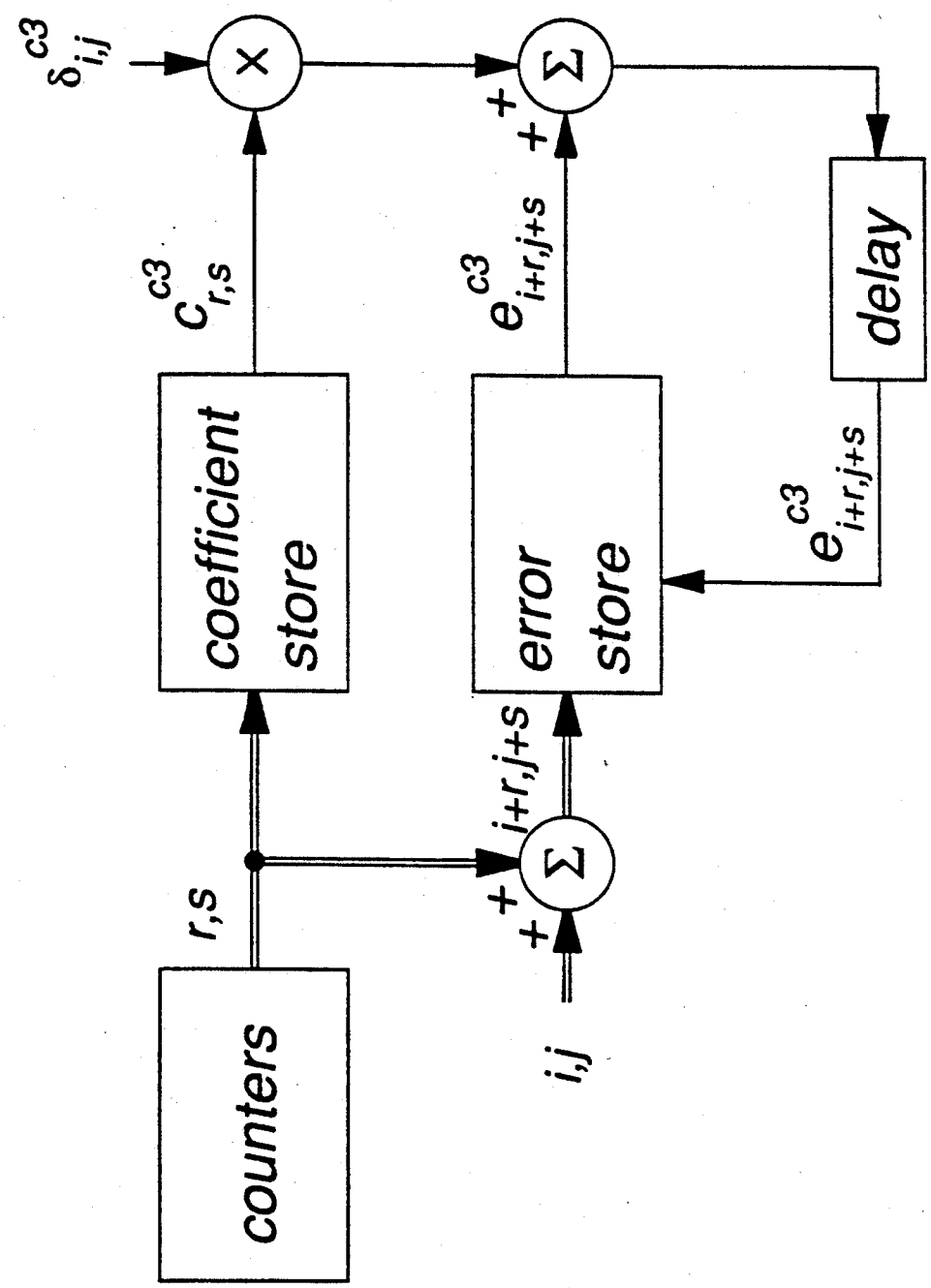
FIG. 2(c) is a diagrammatic representation of a system for incrementing the diffused errors for the third color plane in accordance with the invention.

An implementation of this step is illustrated in FIG. 2(c). This implementation is similar to the implementation of FIG. 2(a), except that the quantization error for color 3, the coefficient store for color 3, and the error store for color 3 are substituted for the quantization error for color 1, the coefficient store for color 1, and the error store for color 1, respectively.

As mentioned above, in the preferred embodiment color-1 is green, color-2 is red, color-3 is blue. The constants are made equal to 1.0, i.e., $\alpha^{12} = 1.0$, $\alpha^{13} = 1.0$, $\alpha^{23} = 1.0$, and the sums of the coefficients are made equal to 1.0, $\gamma^{c1} = 1.0$, $\gamma^{c2} = 1.0$, $\gamma^{c3} = 1.0$. Note that with these choices:

in step 2 the green output value is chosen to minimize the difference between the green input value and the green output value;

in step 5, the red output value is chosen to minimize the difference between the sum of the green and red input values and the sum of the green and red output values; and in step 8, the blue output value is chosen to minimize the difference between the sum of the green, red and blue input values and the sum of the green, red and blue output values.

Figure 3:
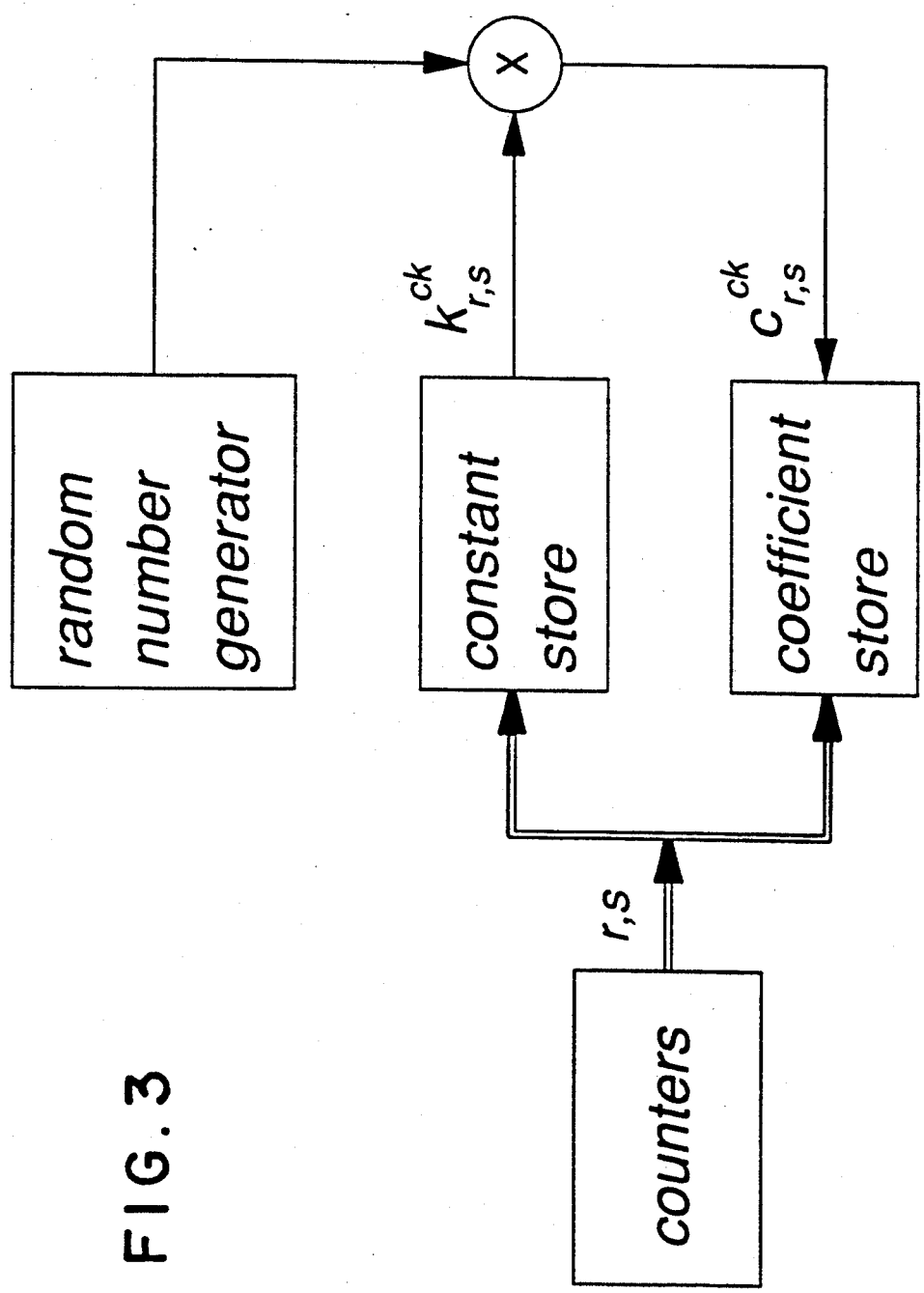
FIG. 3 is a diagrammatic representation of a system for generating coefficients for random error diffusion.

The coefficients in the error diffusion processing may be sets of constants or, if desired, may be random variable coefficients. An implementation of the latter processing is illustrated in FIG. 3. As shown in the figure, a random number generator is used to provide random number signals which are multiplied by respective constants from a constant store. The constant store is connected to the index-generating counters of FIGS. 2 along with the coefficient store therein, and the products of the random numbers and the constants are input to the coefficient store, the output of which acts to provide respective multipliers for the diffused errors.

It has been found that the invention gives significantly improved performance when compared with that of independent color error diffusion, as the output images produced feature much less apparent graininess, while little additional computation is required. Additionally, the use of the quantization-error from color planes already processed to modify other color planes could also be used to improve dithered color images. Further the invention will be found useful in color imaging applications particularly for displays that are severely quantized (e.g., LCDs) or with shallow frame buffers (e.g., IBM Model 8514A).

What is claimed is:

1. A computerized method for producing an improved quality output representation of full-color input images on devices that produce a comparatively small number of possible output colors, by processing the signals representing the input pixels of the color image, in order, comprising the steps of:

providing a source for a set of output signals corresponding to the possible output-pixel values for the output colors;

receiving input signals representing at least two color components of the input pixels at each pixel position of the color image;

choosing an initial pixel position among said pixel positions and selecting, in accordance with said input signals at said initial position, output-pixel values from among the possible output pixel-values for each of the color components, and providing signals indicative of said selected output-pixel values to said output source;

developing signals indicative of diffused errors for each of the color components at each pixel position following said initial pixel position;

summing said received input signals and said diffused error signals to produce signals indicative of respective modified-pixel values for each of the color components at said each pixel position;

selecting, in accordance with said signals indicative of the respective modified-pixel values, output-pixel values from among the possible output pixel-values for each of the color components at said each pixel position, and providing signals indicative of said selected output-pixel values to said output source;

determining the quantization errors for each of said color components as the difference between the modified-pixel value for a color component and the selected output-pixel value for said color component, and producing signals indicative of the quantization errors for each of the color components at said each pixel position; and adding, at said each pixel position, the products of respective constants and the quantization errors of each of the preceding color components at the respective pixel position to the respective modified-pixel value for each color component at the respective position, prior to said selecting of the output-pixel values, such that said signals indicative of the respective modified-pixel values are modified by preceding color component quantization errors and effect the selection of the respective signals indicative of said selected output-pixel values provided to said output source.

2. A method as in claim 1 further comprising, beginning with the first pixel position following said initial pixel position, incrementing the diffused errors at pixel positions not yet processed, by the steps of:

incrementing the diffused error for said first color component at each such pixel position by an amount computed from the product of one of a first set of coefficients and said quantization error for said first color component at said first pixel position;

incrementing the diffused error for said second color component at each such pixel position by an amount computed from the product of one of a second set of coefficients and said quantization error for said second color component at said first pixel position;

incrementing the diffused error for a next color component at each such pixel position by an amount computed from the product of one of a third set of coefficients and said quantization error for said next color components at said first pixel position; and incrementing the diffused error for further color components at each such pixel position by an amount computed from the product of one of a respective set of coefficients and the respective quantization error for the respective further color component at said first pixel position.

3. A method as in claim 2 further comprising generating the values for said sets of coefficients used in incrementing said diffused errors, comprising the steps of:
   generating random numbers; and
   computing the products of said generated random numbers and respectively selected constants from respective sets of constants and generating output signals indicative of the values of said products as the values for said sets of coefficients.

4. A method as in claim 3 wherein said sets of coefficients are regenerated after the processing of each pixel.

5. A method as in claim 1 further comprising the step of setting the diffused errors for each of the color components at each pixel position equal to zero, prior to processing the signals representing the input pixels of the color image.

6. Apparatus for producing an improved quality output representation of full-color input images on devices that produce a comparatively small number of possible output colors, by processing the signals representing the input pixels of the color image, in order, comprising:
   output means for providing a set of output signals corresponding to the possible output-pixel values for the output colors;
   means for receiving input signals representing at least two color components of the input pixels at each pixel position of the color image;
   error diffusion means for providing signals indicative of diffused errors for each of the color components at each pixel position with respect to the color components at a selected initial pixel position;
   first summing means for summing said received input signals and said diffused erro signals to produce signals indicative of respective modified-pixel values for each of the color components at said each pixel position;
   quantizing means, responsive to said signals indicative of the respective modified-pixel values, for selecting output-pixel values from amoung the possible output pixel-values for each of the color components at said each pixel position, and providing signals indicative of said selected output-pixel values to said output means;
   second summing means, responsive to the difference between the modified-pixel value for a color component and the selected output-pixel value for said color component, for producing signals indicative of the quantization errors for each of the colors components at said each pixel position; and
   third summing means, connected to said quantizing means and responsive to said quantization error signals, for adding, at said each pixel position, the product of respective constants and the quantization errors of each of the preceding color components at the respective pixel position to the respective modified-pixel value for each color component at the respective position, prior to the providing of said signals indicative of the respective modified-pixel values to said quantizing means, and providing signals indicative of the results of said adding to said quantizing means.

7. Apparatus as in claim 6 wherein said quantizing means comprises a look-up-table.

8. Apparatus as in claim 6 further comprising means for setting the diffused errors for each of the color components at each pixel position equal to zero, prior to processing the signals representing the input pixels of the color image.

9. Apparatus as in claim 6 further comprising means, responsive to said selecting of output-pixel values by said quantizing means at a first pixel position following said initial pixel position, for incrementing the diffused errors at pixel positions not yet processed, by the steps of:
   incrementing the diffused error for said first color component at each such pixel position by an amount computed from the product of one of a first set of coeffecients and said quantization error for said first color component at said first pixel position;
   incrementing the diffused error for said second color component at each such pixel position by an amount computed from the product of one of a second set of coefficients and said quantization error for said second color component at said first pixel position;
   incrementing the diffused error for a next color component at each such pixel position by an amount computed from the product of one of a third set of coefficients and said quantization error for said next color components at said first pixel position; and
   incrementing the diffused error for further color components at each such pixel postiion by an amount computed from the product of one of a respective set of coefficients and the respective quantization error for the respective further color component at said first pixel position; and
   means for activating said output means to provide output signals from said set of output signals corresponding to the selected output-pixel values for the color components at each pixel postion.

10. Apparatus as in claim 9 further comprising means for generating the values for said sets of coefficients used in said error diffusion means, comprising:
   means for generating random numbers;
   means for computing the products of said generated random numbers and respectively selected constants from respective sets of constants and generating output signals indicative of the values of said products as the values for said sets of coefficients.

11. Apparatus as in claim 10 wherein said sets of coefficients are generated after the processing of each pixel.

12. A computerized method for producing improved quality output representations of full-color images on devices that produce a comparatively small number of output colors, by processing the signals representing the input pixels of the color image, in order, according to the steps comprising:
   providing a source of output signals corresponding to the possible output-pixel values for the output colors;
   receiving input signals representing at least two color components of the input pixels at each pixel position of the color image;
   choosing an initial pixel position amoung said pixel positions and selecting, in accordance with said input signals at said initial position, output-pixel values from amoung the possible output pixel-values for each of the color components, and providing signals indicative of said selected output-pixel values to said output source;
   computing, at the first pixel position following said initial pixel position, the modified-pixel values of said color components;

selecting the output-pixel value for the first color component from amoung the possible output-pixel values near the modified-pixel value for the first color component;

computing the quantization error for the first color component as the difference between said modified-pixel value for the first color component and said selected output-pixel value for the first color component;

selecting the output-pixel value for the second color component from amoung the possible output-pixel values near the sum of the modified-pixel value of the second color component and the product of a first constant and said quantization error for the first color component;

computing the quantization error for the second color component as the difference between said modified-pixel value for the second color component and said output-pixel value for the second color component;

selecting the output-pixel value for a next color component from amoung the possible output-pixel values near the sum of the modified-pixel value for said next color component and the product of a second constant and said quantization error for the first color component and the product of a third constant and said quantization error for the second color component;

computing the quantization error for said next color component as the difference between said modified-pixel value and said output-pixel value of said next color component; and selecting ouput pixel values for futher color components using the repective modified-pixel value summed with the products of successive constants and the repective quantization errors of said first color component and successive preceding color components, with the respective quantization errors being computed as the difference between the modified-pixel value and the output-pixel value of the respective color component; and incrementing, at pixel positions not yet processed, the diffused error for said first color component at each such pixel position by an amount computed from the product of one of a first set of coefficients and said quantization error for said first color component at said first pixel position, incrementing the diffused error for said second color component at each such pixel position by an amount computed from the product of one of a second set of coefficients and said quantization error for said second color component at said first pixel position, and incrementing the diffused error for a next color component at each such pixel position by an amount computed from the product of one of a third set of coefficients and said quantization error for said next color components at said first pixel position;

incrementing the diffused error for further color components at each such pixel position by an amount computed from the product of one of a respective set of coefficients and the respective quantization error for the respective further color component at said first pixel position;

processing the signals representing the input pixels at the remaining pixel positions by repreating the computing, selecting, and incrementing steps in the same manner as the processing of the input pixel signals at said first pixel position; and producing output corresponding to the selected output-pixel values for the output colors at each pixel position to reproduce the color image.

13. A method as in claim 12 further comprising generating the values for said sets of coefficients used in incrementing said diffused erros, by the steps of:

generating random numbers; and computing the products of said generated random numbers and respectively selected constants from respective sets of constants and generating output signals indicative of the values of said products as the values for said sets of coefficients.

14. A method as in claim 13 wherein said sets of coefficients are regenerated after the processing of each pixel.

15. A method as in claim 12 further comprising the step of setting the diffused errors for each of the color components at each pixel position equal to zero, prior to processing the signals representing the input pixels of the color image, in order.

16. Apparatus for producing an improved quality output representation of full-color input images on devices that produce a comparatively small number of possible output colors, by processing the signals representing the input pixels of the color image, in order, comprising:

means for providing a set of output signals corresponding to the possible output-pixel values for the output colors;

means for receiving input signals representing at least two color components of the input pixels at each pixel position of the color image;

means for choosing an initial pixel position among said pixel positions and selecting, in accordance with said input signals at said initial position, output-pixel values from among the possible output pixel-values for each of the color components, and providing signals indicative of said selected output-pixel values to said means for providing a set of corresponding output signals;

means for processing said received input signals to produce modified-pixel values for each of the color components at each pixel position following said initial pixel position, wherein a modified-pixel value is the sum of the input-pixel value of a color component of an input signal and the diffused error for said color component;

means for selecting output-pixel values from among the possible output pixel-values for each of the color components at said each pixel position, using said modified-pixel values and quantization errors, wherein a quantization error is the difference between the modified-pixel value for a color component and the output-pixel value for said color component, by the steps of:

selecting an output-pixel value for the first color component at a given pixel position as one of the possible output-pixel values near the modified-pixel value for said first color component;

selecting an output-pixel value for the second color component at the given position as one of the possible output-pixel values near the sum of the modified-pixel value for said second color component and the product of a first constant and the quantization error for said first color component;

selecting an output-pixel value for the next color component at the given position as one of the possible output-pixel values near the sum of the modified-pixel value for said next color component and the product of a second constant and the quantization error for said first color component and the product of a third constant and the quantization error for said second color component; and selecting output-pixel values for further color components at the given position as one of the possible output-pixel values near the sum of the modified-pixel value for the respective color component and the products of respective constants and the quantization errors for all of the preceding color components; and means, responsive to said selecting of output-pixel values by said selecting means at the first pixel position following said initial pixel position, for incrementing the diffused errors at pixel positions not yet processed, by the steps of:

incrementing the diffused error for said first color component at each such pixel position by an amount computed from the product of one of a first set of coefficients and said quantization error for said first color component at said first pixel position;

incrementing the diffused error for said second color component at each such pixel position by an amount computed from the product of one of a second set of coefficients and said quantization error for said second color component at said first pixel position;

incrementing the diffused error for a next color component at each such pixel position by an amount computed from the product of one of a third set of coefficients and said quantization error for said next color components at said first pixel position; and incrementing the diffused error for further color components at each such pixel position by an amount computed from the product of one of a respective set of coefficients and the respective quantization error for the respective further color component at said first pixel position;

means for repeatedly activating said processing, selecting, and incrementing means to produce a set of output signals corresponding to the selected output-pixel values for the color components at each of the pixel positions remaining after said initial pixel position; and means for activating said output signal providing means to provide output signals from said set of output signals corresponding to the selected output-pixel values for the color components at each remaining pixel position.

17. Apparatus as in claim 16 further comprising means for generating the values for said sets of coefficients used in said error diffusion means, comprising:

means for generating random numbers;

means for computing the products of said generated random numbers and respectively selected constants from respective sets of constants and generating output signals indicative of the values of said products as the values for said sets of coefficients.

18. Apparatus as in claim 17 wherein said sets of coefficients are generated after the processing of each pixel.

* * * * *